(12) United States Patent
Imanishi (10) Patent No.: US 11,314,040 B2
(45) Date of Patent: Apr. 26, 2022

(54) LENS APPARATUS, CAMERA SYSTEM, AND LENS DRIVING METHOD

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 468 days.

(21) Appl. No.: 16/351,432

(22) Filed: Mar. 12, 2019

(65) Prior Publication Data

US 2019/0212522 A1 Jul. 11, 2019

Related U.S. Application Data

(63) Continuation of application No. PCT/JP2017/029776, filed on Aug. 21, 2017.

(30) Foreign Application Priority Data

Sep. 15, 2016 (JP) .............................. JP2016-180810

(51) Int. Cl.
*G02B 7/10* (2021.01)
*H04N 5/232* (2006.01)
(Continued)

(52) U.S. Cl.
CPC ............. *G02B 7/102* (2013.01); *G02B 7/021* (2013.01); *G02B 7/08* (2013.01); *G02B 27/0025* (2013.01);
(Continued)

(58) Field of Classification Search
USPC .......................................... 359/696; 396/133
See application file for complete search history.

(56) References Cited

U.S. PATENT DOCUMENTS 5,202,717 A 4/1993 Ookubo et al.
9,001,264 B2 4/2015 Watazawa
(Continued)

FOREIGN PATENT DOCUMENTS

CN 103135318 6/2013
CN 104155740 11/2014
(Continued)

OTHER PUBLICATIONS

"Office Action of Germany Counterpart Application," with English translation thereof, dated Dec. 13, 2019, p. 1-p. 13.
(Continued)

*Primary Examiner* — Clayton E. LaBalle
*Assistant Examiner* — Warren K Fenwick
(74) *Attorney, Agent, or Firm* — JCIPRNET (57) ABSTRACT

An object of the present invention is to provide a lens apparatus, a camera system, and a lens driving method capable of achieving both a driving range and a resolution of a focus lens. A lens group having a large number of stopable positions due to a high driving resolution, a long driving range, and the like may be set as a first focus lens group. In this case, depending on communication restrictions (command bit length) between a camera body and the lens apparatus, the lens apparatus may not be driven at the desired position and resolution. Therefore, in the lens apparatus according to the first aspect of the present invention, a lens having a small number of stopable positions is driven as a first focus lens group through communication, and the second focus lens group is driven without being restricted by a communication command through calculation in the lens apparatus. Thereby, it is possible to achieve both the driving range and the resolution of the focus lens.

13 Claims, 7 Drawing Sheets

(51) Int. Cl.
*G02B 7/02* (2021.01)
*H04N 5/225* (2006.01)
*G02B 27/00* (2006.01)
*G02B 7/08* (2021.01)
*G03B 17/14* (2021.01)

(52) U.S. Cl.
CPC .......... *G03B 17/14* (2013.01); *H04N 5/2252* (2013.01); *H04N 5/2254* (2013.01); *H04N 5/23212* (2013.01)

(56) References Cited

U.S. PATENT DOCUMENTS

| | | | |
|---|---|---|---|
| 9,025,946 | B2 | 5/2015 | Kikuchi |
| 10,045,693 | B2* | 8/2018 | Morishima ............ A61B 3/103 |
| 2010/0060781 | A1 | 3/2010 | Yumiki et al. |
| 2012/0262595 | A1* | 10/2012 | Kishida ................. G03B 13/36 348/220.1 |
| 2013/0010373 | A1* | 1/2013 | Abe ....................... G02B 7/282 359/698 |
| 2013/0107105 | A1 | 5/2013 | Ishikawa et al. |
| 2015/0247988 | A1 | 9/2015 | Kishida et al. |
| 2016/0147040 | A1* | 5/2016 | Watanabe .............. G02B 7/282 396/81 |

FOREIGN PATENT DOCUMENTS

| | | |
|---|---|---|
| CN | 105629428 | 6/2016 |
| DE | 112011102641 | 6/2013 |
| JP | H04063308 | 2/1992 |
| JP | 2002350714 | 12/2002 |
| JP | 2011242791 | 12/2011 |
| JP | 2013097024 | 5/2013 |
| JP | 2014167526 | 9/2014 |
| JP | 2014232210 | 12/2014 |
| JP | 2016099605 | 5/2016 |

OTHER PUBLICATIONS

Office Action of China Counterpart Application, with English translation thereof, dated Aug. 27, 2020, pp. 1-12.
"International Search Report (Form PCT/ISA/210) of PCT/JP2017/029776," dated Nov. 21, 2017, with English translation thereof, pp. 1-5.
"Written Opinion of the International Searching Authority (Form PCT/ISA/237) of PCT/JP2017/029776," dated Nov. 21, 2017, with English translation thereof, pp. 1-7.

* cited by examiner

LENS APPARATUS, CAMERA SYSTEM, AND LENS DRIVING METHOD

CROSS-REFERENCE TO RELATED APPLICATIONS

The present application is a Continuation of PCT International Application No. PCT/JP2017/029776 filed on Aug. 21, 2017 claiming priority under 35 U.S.C. § 119(a) to Japanese Patent Application No. 2016-180810 filed on Sep. 15, 2016. Each of the above applications is hereby expressly incorporated by reference, in their entirety, into the present application.

BACKGROUND OF THE INVENTION

1. Field of the Invention

The present invention relates to a lens apparatus, a camera system, and a lens driving method, and particularly to a lens apparatus, a camera system, and a lens driving method for driving a plurality of focus lens groups.

2. Description of the Related Art

Camera systems each driving a lens group on the lens apparatus side on the basis of a command from a camera body have been known. In such a camera system, the lens apparatus may have a plurality of lens groups. For example, in JP2014-167526A, in a case of driving a focus lens including a plurality of lens groups, the focus lens consists of one lens group, an amount of movement of the lens is calculated, and an instruction about the amount of movement is issued from the camera body to an interchangeable lens. Then, the interchangeable lens calculates amounts of driving of first and second lenses, on the basis of position information of the first and second lenses and table information showing a relationship between an amount of lens movement and the amount of driving instructed from the camera body.

In addition, in JP1992-063308A (JP-H04-063308A), in a case of driving a lens group in a camera system having a plurality of lens groups, the driving target position of the second lens group corresponding to the position of the first lens group is calculated on the basis of the numerical expression for position calculation.

SUMMARY OF THE INVENTION

In a case of driving the lens on the basis of a command issued from the camera body to the lens apparatus (interchangeable lens), it is necessary to set a position detection resolution and a stroke (amount of movement) within the limit of the bit length of the communication command issued from the camera body to the lens apparatus. For example, the movable range (the number of stopable positions) of the focus lens is determined by the bit length of a command for specifying the position of the lens. Therefore, in the case of a lens whose resolution may be low, the moving range can be widened. However, in the case of a lens requiring high resolution, the movable range becomes narrow. Therefore, in a case where focusing can not be performed on an object to be captured within a narrow movement range, the resolution has to be reduced in order to enlarge the movement range.

Further, in the case of a macro lens or the like, a configuration is adopted in which a plurality of groups of focus lenses are displaced in order to achieve both peripheral resolution performance and aberration performance. However, in a case where each lens group needs to be separately driven by an actuator, the lens group is controlled through communication with the camera body. Then, the system becomes complicated and the design becomes difficult since each lens group has different precision applied to the focal plane.

Regarding the above-mentioned situation, JP2014-167526A does not take into consideration the driving precision of the first and second lenses. Further, the focus lens consists of one lens group. With such a configuration, the amount of movement of the lens is calculated. Therefore, it is not possible to optionally designate the stop precision (driving resolution) of the lens that needs to be driven at a relatively high precision. In addition, in JP1992-063308A (JP-H04-063308A), in a case of using an interchangeable lens system, both the driving range and the resolution of the lens may not be achieved due to the restriction of the bit length of the above-mentioned communication command.

As described above, the technology of the related art can not achieve both the driving range and the resolution of the focus lens.

The present invention has been made in view of such circumstances, and an object thereof is to provide a lens apparatus, a camera system, and a lens driving method capable of achieving both the driving range and the resolution of the focus lens.

In order to achieve the above-mentioned object, a lens apparatus according to a first aspect of the present invention is to be mounted on a camera body. The lens apparatus comprises: a plurality of focus lens groups that includes a first focus lens group and a second focus lens group which are separately driven; a target position acquisition section that acquires a first target position, which is a driving target position of the first focus lens group, at a predetermined bit length through communication with the camera body; a calculation section that calculates a second target position, which is a driving target position of the second focus lens group, on the basis of the first target position; and a driving section that drives the first focus lens group and the second focus lens group in accordance with the first target position and the second target position. The first focus lens group is a focus lens group in which the number of stopable positions is less than that of the second focus lens group.

A lens group having a large number of stopable positions due to a high driving resolution, a long driving range, and the like may be set as a first focus lens group. In this case, depending on communication restrictions (command bit length) between a camera body and the lens apparatus, the lens apparatus may not be driven at the desired position and resolution. Therefore, in the first aspect, a lens having a small number of stopable positions is driven as a first focus lens group through communication, and the second focus lens group is driven without being restricted by a communication command through calculation in the lens apparatus. Thereby, it is possible to achieve both the driving range and the resolution of the focus lens.

In the first aspect, the lens apparatus may be an interchangeable lens attachably and detachably mounted on the camera body. Further, the first and second focus lens groups may be composed of one or more optional number of lenses.

In the lens apparatus according to a second aspect, in the first aspect, the first focus lens group is a focus lens group of which a predetermined variation in lens characteristic of the lens apparatus is less than that of the second focus lens group in a case where a same amount of displacement is given to each focus lens groups. In the second aspect, by defining a certain type lens group as the first focus lens group, the focus lens group, of which the predetermined variation in lens characteristic of the lens apparatus is less than that of the second focus lens group in a case where the same amount of displacement is given to each focus lens groups, is set as the "first focus lens group". Therefore, even in a case where the first focus lens group is driven through communication with the camera body (the bit length of the command is limited, and thus the resolution has to be lowered depending on the amount of driving), the variation in characteristic of the entire lens apparatus is small. In addition, since the second focus lens group is driven through calculation in the lens apparatus, the lens group can be driven with a high precision without restriction in communication by achieving both driving range and resolution. According to the second aspect, since the apparently one lens is controlled by the camera body, the system such as the control system and the communication system can be simplified.

In the lens apparatus according to the third aspect, in the second aspect, the predetermined variation in lens characteristic is a variation in position of an image plane at a unit amount of displacement. In the third aspect, by defining one of the lens characteristics that vary in accordance with the displacement of the lens, the lens group, of which the variation in position of the image plane at the unit amount of displacement is less than that of the second focus lens group, is referred to as the "first focus lens group". Therefore, the "second focus lens group" can be driven at a high precision by achieving both the driving range and the resolution without restriction in communication through calculation in the lens apparatus.

In the lens apparatus according to a fourth aspect, in the second or third aspect, a driving resolution of the first focus lens group and a driving resolution of the second focus lens group are separately set. In addition, the driving resolution of the first focus lens group is lower than the driving resolution of the second focus lens group. In the fourth aspect, by setting the lens group having a low driving resolution as the first focus lens group, the second focus lens group having a high driving resolution can be driven on the lens apparatus side at a high precision without restriction in communication. As a result, it is possible to achieve both the driving range and the resolution.

In the lens apparatus according to a fifth aspect, in any one of the second to fourth aspects, the predetermined variation in lens characteristic is a variation in imaging distance of an in-focus object at a unit amount of displacement. In the fifth aspect, by defining one aspect of the lens characteristic that varies in accordance with the displacement of the lens, a lens group having a small variation in imaging distance of the in-focus object at the unit amount of displacement is set as the first focus lens group. With such a configuration, even in a case where the first focus lens group is driven through communication with the camera body which is restricted by the bit length, the variation in lens characteristic of the entire lens apparatus can be reduced. Further, by driving the second focus lens group through calculation in the lens apparatus, it is possible to achieve both the driving range and the resolution without restriction in communication.

In the lens apparatus according to a sixth aspect, in any one of the second to fifth aspects, the first focus lens group is a focus lens group of which a desired amount of displacement from a state in which the object at an infinite imaging distance is in focus to a state in which an object at a shortest imaging distance is in focus is less than that of the second focus lens group. In a case where a lens group having a large desired amount of displacement is set as the first focus lens group, the driving resolution may have to be reduced depending on the amount of displacement due to the restriction of the bit length of the communication command. Therefore, in the sixth aspect, a lens group having the desired amount of displacement is set as the first focus lens group, and the second focus lens group having a larger desired amount of displacement is driven through calculation in the lens apparatus. Thereby, it is possible to perform driving at a high precision in the lens apparatus without restriction in communication, and it is possible to achieve both the driving range and the resolution.

In the lens apparatus according to a seventh aspect, in any one of the second to sixth aspects, the predetermined variation in lens characteristic is a variation in image magnification at a unit amount of displacement. In the seventh aspect, by defining one aspect of the lens characteristic that varies in accordance with the displacement of the lens, a lens group having a small variation in image magnification at the unit amount of displacement is set as the first focus lens group. With such a configuration, even in a case where the first focus lens group is driven through communication with the camera body which is restricted by the bit length, the variation in lens characteristic of the entire lens apparatus can be reduced. Further, by driving the second focus lens group through calculation in the lens apparatus, it is possible to achieve both the driving range and the resolution without restriction in communication.

In the lens apparatus according to an eighth aspect, in any one of the first to seventh aspects, the calculation section calculates the second target position by referring to a relationship between an amount of displacement of the first focus lens group and an amount of displacement of the second focus lens group stored in advance. In the eighth aspect, processing of calculating the second target position is specifically defined.

In the lens apparatus according to a ninth aspect, in any one of the first to eighth aspects, the plurality of focus lens groups includes an aberration correction lens group for correcting optical aberration of the lens apparatus caused by displacement of the first focus lens group and/or the second focus lens group. In the ninth aspect, the aberration correction lens group may be the first or the second focus lens group.

In any one of the first to ninth aspects, the lens apparatus according to a tenth aspect further comprises a transmitter that transmits information, which indicates a driving characteristic of the first focus lens group, to the camera body. The target position acquisition section acquires a driving target position, which is generated by the camera body on the basis of the transmitted information, as the first target position. In the tenth aspect, processing of acquiring the first target position (acquiring the target position of the first focus lens generated by the camera body through communication) is specifically defined.

To achieve the above-mentioned object, a camera system according to an eleventh aspect of the present invention comprises the lens apparatus according to any one of the first to tenth aspects, and the camera body on which the lens apparatus is mounted. According to the eleventh aspect, similarly to the first aspect, it is possible to achieve both the driving range and the resolution of the focus lens. In the eleventh aspect, the lens apparatus may be configured as an interchangeable lens attachably and detachably mounted on the camera body.

In order to achieve the above-mentioned object, a lens driving method according to a twelfth aspect of the present invention is a lens driving method for a lens apparatus that is to be mounted on a camera body and includes a plurality of focus lens groups including a first focus lens group and a second focus lens group which are separately driven and a driving section driving the first focus lens group and the second focus lens group. The lens driving method comprises: a target position acquisition step of acquiring a first target position, which is a driving target position of the first focus lens group, at a predetermined bit length through communication with the camera body; a target position calculation step of calculating a second target position, which is a driving target position of the second focus lens group, on the basis of the first target position; and a lens driving step of driving the first focus lens group and the second focus lens group in accordance with the first target position and the second target position. In the target position acquisition step, a focus lens group, of which a predetermined variation in lens characteristic of the lens apparatus is less than that of the second focus lens group in a case where a same amount of displacement is given to each focus lens groups, is set as the first focus lens group, and the first target position is received. According to the twelfth aspect, similarly to the first aspect, it is possible to achieve both the driving range and the resolution of the focus lens. In the twelfth aspect, the "predetermined variation in lens characteristic" may be a variation in lens characteristic relating to the third, fifth, and seventh aspects.

The lens driving method according to a thirteenth aspect further comprises an information transmission step of transmitting information, which indicates a driving characteristic of the first focus lens group, to the camera body. In the target position acquisition step, a driving target position, which is generated by the camera body on the basis of the transmitted information, is acquired as the first target position. In the thirteenth aspect, similarly to the tenth aspect, the processing of acquiring the first target position is specifically defined. As an aspect of the present invention, a program for causing the lens apparatus to execute the lens driving method according to the twelfth and thirteenth aspects and a non-transitory recording medium, on which computer-readable codes of such a program are recorded, may be provided.

As described above, according to the lens apparatus, the camera system, and the lens driving method of the present invention, it is possible to achieve both the driving range and the resolution of the focus lens.

DESCRIPTION OF THE PREFERRED EMBODIMENTS

Hereinafter, embodiments of a lens apparatus, a camera system, and a lens driving method according to an embodiment of the present invention will be described with reference to the accompanying drawings.

First Embodiment

<Configuration of Imaging Apparatus>

Figure 1:
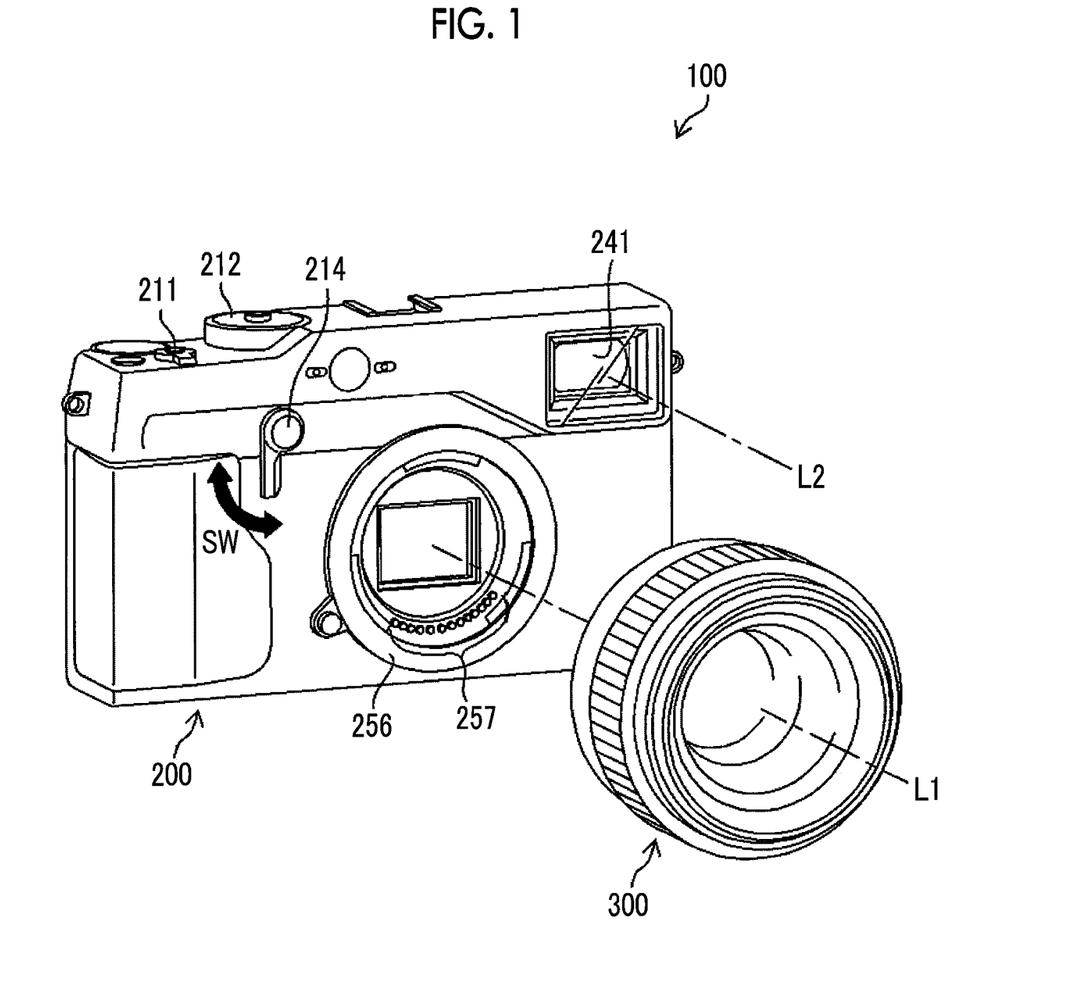
FIG. 1 is an external perspective view illustrating an imaging apparatus according to a first embodiment.
Figure 2:
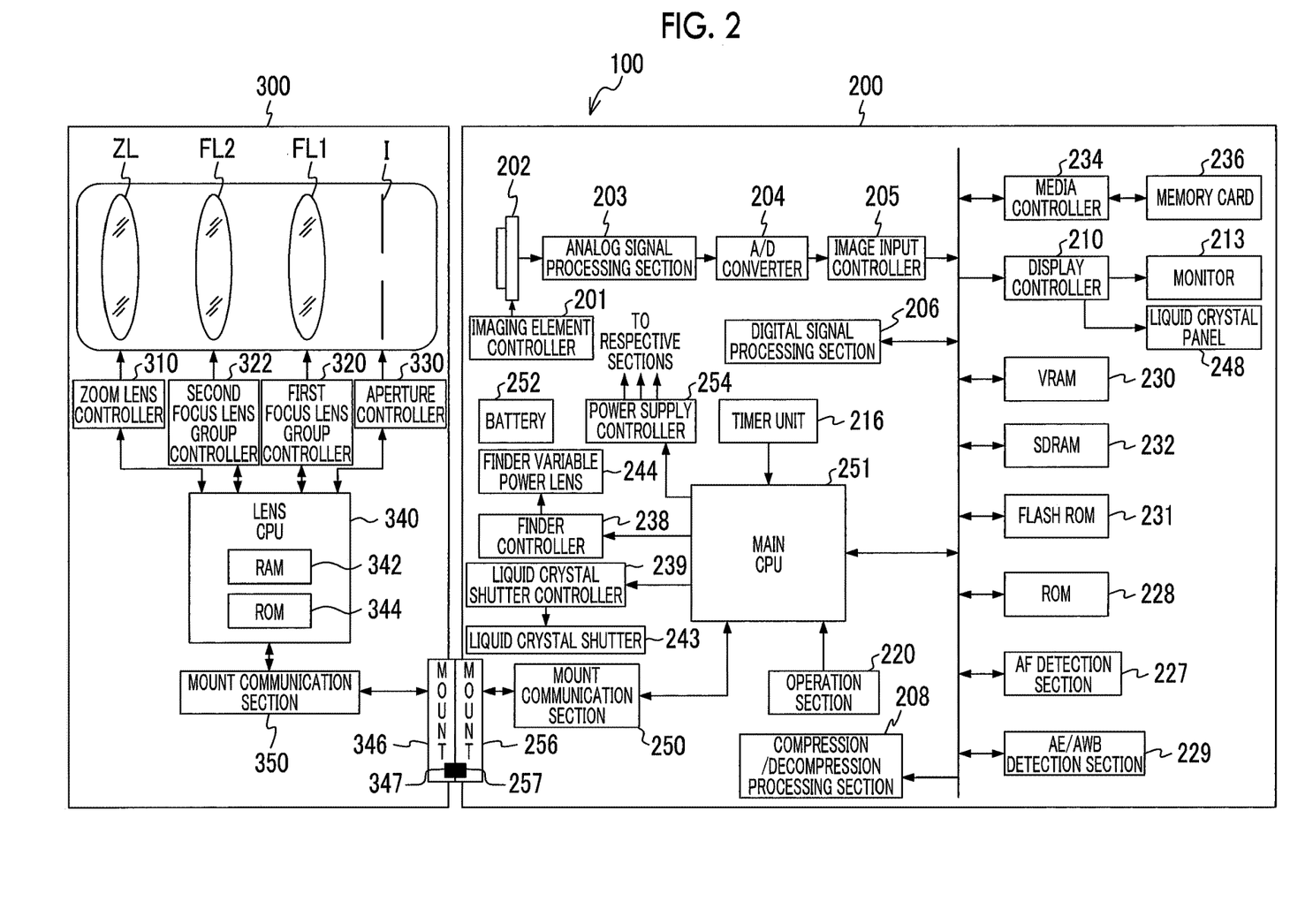
FIG. 2 is a block diagram illustrating a configuration of the imaging apparatus according to the first embodiment.

FIG. 1 is a front perspective view of an imaging apparatus 100 (camera system) which is a lens interchangeable type camera according to a first embodiment of the present invention, and FIG. 2 is a block diagram illustrating a configuration of a main part of the imaging apparatus 100. The imaging apparatus 100 is composed of a camera body 200 (camera body) and an interchangeable lens 300 (lens apparatus) that is interchangeably mounted on the camera body 200. The camera body 200 and the interchangeable lens 300 are interchangeably mounted by coupling a mount 256 provided in the camera body 200 and a mount 346 for the interchangeable lens 300 corresponding to the mount 256.

In addition to a mount 256, a finder window 241, a finder changeover lever 214, and the like are provided on the front surface of the camera body 200. In a case where the finder changeover lever 214 is rotated in a direction of the arrow SW, an image, which can be viewed through the finder, is switched between an optical image and an electronic image. The optical axis L2 of the finder is an optical axis different from the optical axis L1 of the interchangeable lens 300. A release button 211 and a dial 212 for setting an imaging mode are mainly provided on the upper surface of the camera body 200. Not only a finder eyepiece section and a monitor 213 (refer to FIG. 2) but also operation members such as a quick menu display button (Q button), a cross key, a rotation dial, a MENU/OK key, and a DISP/BACK button (DISP: display), a playback button, and the like, which constitute the operation section 220, are mainly provided on the back surface of the camera body 200.

The monitor 213 is used not only for displaying live view images in the imaging mode and playback images in the playback mode but also for displaying a list screen in which icons for setting various parameters are arranged in a two-dimensional matrix.

The finder is composed of not only the finder window 241, a liquid crystal shutter 243, a finder variable power lens 244, and a liquid crystal panel 248, but also a finder eyepiece section, an objective lens, a prism, an eyepiece lens, a lens for a liquid crystal panel, and the like which are not shown in the drawing.

FIG. 2 is a block diagram illustrating a configuration of a main part of the imaging apparatus 100. The operation of the imaging apparatus 100 is integrally controlled by a main central processing unit 251 (CPU) of the camera body 200 and a lens CPU 340 (a target position acquisition section, a calculation section, a driving section, and a transmitter) of the interchangeable lens 300.

Figure 3:
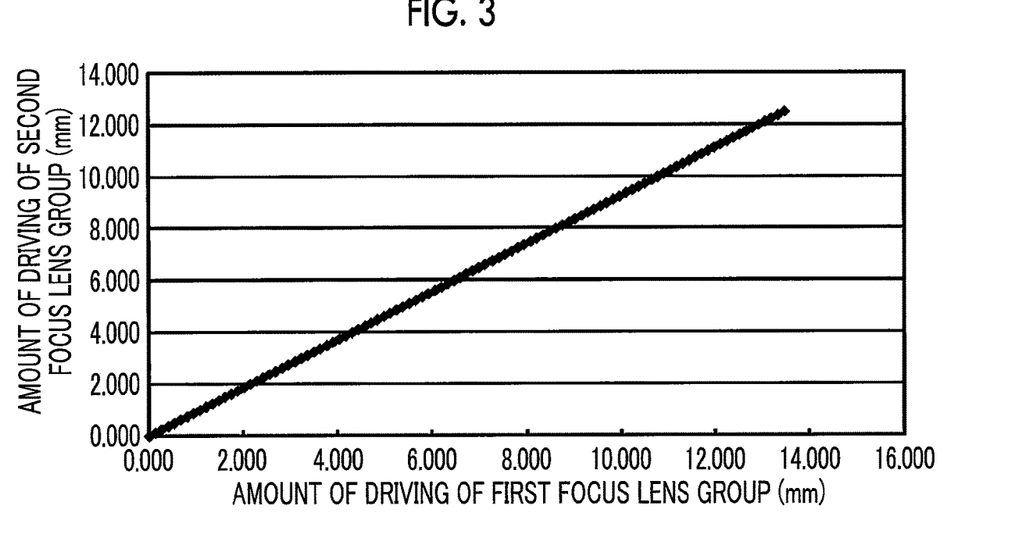
FIG. 3 is a diagram illustrating a relationship between an amount of driving of a first focus lens group and an amount of movement of a second focus lens group.

The main CPU 251 develops a camera control program (including programs relating to driving of the interchangeable lens 300), which is stored in a flash read only memory 231 (ROM), into a synchronous dynamic random access memory 232 (SDRAM), and executes various kinds of processing while using the SDRAM 232 as a work memory. The flash ROM 231 stores control programs to be executed by the main CPU 251, various data necessary for control, and the like. The ROM 228 stores various setting information and the like relating to the operation of the imaging apparatus 100 such as user setting information and the like. The SDRAM 232 is used as a calculation work area of the main CPU 251 and also as a temporary storage area of image data. Further, the lens CPU 340 develops a lens control program stored in a ROM 344 (non-transitory recording medium) into a random access memory 342 (RAM), and executes various kinds of processing while using the RAM 342 as a work memory. The lens control program stored in the ROM 344 includes a program for causing the interchangeable lens 300 to execute the lens driving method of the embodiment of the present invention. In addition, the ROM 344 stores the number of focus lens groups, the driving characteristic of each focus lens group, data about which focus lens group is the "first focus lens group", a relationship between an amount of driving of the first focus lens group FL1 and an amount of driving of the second focus lens group FL2 (refer to FIG. 3), and the like.

In a case where a user operates the operation section 220, a signal from the operation section 220 is input to the main CPU 251. The main CPU 251 controls each circuit of the camera body 200 on the basis of the input signal, and transmits and receives signals to and from the interchangeable lens 300 through the mount 256 and a mount communication section 250.

A terminal 257 is provided on the mount 256, and a terminal 347 is provided on the mount 346. In a case where the interchangeable lens 300 is mounted on the camera body 200, the corresponding terminal 257 and the terminal 347 contact each other, such that communication is possible (it should be noted that the terminals 257 and 347 in FIGS. 1 and 2 are conceptually shown, and the positions and the number of the terminals in the present invention are not limited thereto). Communication between the camera body 200 and the interchangeable lens 300 for a driving command for the focus lens group, various control statuses (lens driving start, completion notice, and/or the like), the driving characteristic of the focus lens group, and the like are performed. The terminals include, for example, a ground terminal, a synchronization signal terminal, a serial communication terminal, a control status communication terminal, and a power supply terminal from the battery 252 of the camera body 200 to each part of the interchangeable lens 300.

<Configuration of Interchangeable Lens>

The interchangeable lens 300 is mainly composed of a zoom lens ZL, a first focus lens group FL1 (a first focus lens group), a second focus lens group FL2 (a second focus lens group), a stop I, a lens CPU 340, and the like. Although the interchangeable lens 300 can be a macro lens, the present invention is not limited thereto.

The zoom lens ZL, the first focus lens group FL1, and the second focus lens group FL2 move back and forth on the same optical axis L1 (refer to FIG. 1), thereby performing zooming and focusing. The zoom lens ZL is driven by the zoom lens controller 310, thereby changing the imaging magnification. The first focus lens group FL1 and the second focus lens group FL2 are driven by the first focus lens group controller 320 and the second focus lens group controller 322, respectively. The zoom lens controller 310, the first focus lens group controller 320, and the second focus lens group controller 322 comprise motors and position sensors. The motors are for respectively driving the zoom lens ZL, the first focus lens group FL1, and the second focus lens group FL2. The position sensors detect the current positions of the lens and the lens groups in the direction of the optical axis. In the first embodiment, the focus lens group on the camera body 200 side is set as the first focus lens group FL1, and the focus lens group on the object side is set as the second focus lens group FL2. However, this relationship may be reversed.

A stop I controls an amount of light incident on an imaging element 202, thereby controlling exposure together with a shutter speed. The stop I is composed of, for example, five stop leaf blades, and is controlled in six stages with an aperture value of F1.4 to F11 in increments of 1 aperture value (AV). The stop I is driven by the stop controller 330, and an amount of aperture thereof is adjusted.

The lens CPU 340 determines the amount of movement of the zoom lens ZL on the basis of the lens target position and the current position of the zoom lens ZL detected by the above position sensor in the direction of the optical axis. Further, the lens CPU 340 determines the amount of driving of the first focus lens group FL1 on the basis of the current position of the first focus lens group FL1 detected by the above-mentioned position sensor in the direction of the optical axis and the lens target position of the first focus lens group FL1 received from the camera body 200. Further, the lens CPU 340 determines the amount of driving of the second focus lens group FL2 on the basis of the current position of the second focus lens group FL2 detected by the above-mentioned position sensor in the direction of the optical axis L1 and a relationship (stored in advance in the ROM 344 of the interchangeable lens 300; refer to FIG. 3) between the amount of driving of the first focus lens group FL1 and the amount of driving of the second focus lens group FL2. Detailed description of characteristics of the first focus lens group FL1 and the second focus lens group FL2 and driving of these focus lens groups will be described later.

In accordance with a command from the lens CPU 340, the zoom lens controller 310 moves the zoom lens ZL in the direction of the optical axis L1, thereby varying the imaging magnification. Further, in accordance with a command from the lens CPU 340, the first focus lens group controller 320 (driving section) and the second focus lens group controller 322 (driving section) separately move back and forth the first focus lens group FL1 and the second focus lens group FL2 along the direction of the optical axis, thereby bringing the object into focus. The stop controller 330 changes an aperture value of the stop I in accordance with a command from the lens CPU 340.

<Light-Receiving and Imaging>

The imaging element 202 is disposed at the subsequent stage of the zoom lens ZL, the first focus lens group FL1, the second focus lens group FL2, and the stop I, and receives object light transmitted through the zoom lens ZL, the first focus lens group FL1, the second focus lens group FL2, and the stop I. The imaging element 202 has a light-receiving surface on which a large number of light-receiving elements are arranged in a matrix. The object light transmitted through the zoom lens ZL, the first focus lens group FL1, the second focus lens group FL2, and the stop I is imaged on the light-receiving surface of the imaging element 202, and converted into an electric signal by each light-receiving element. As the imaging element 202, various photoelectric conversion elements such as a complementary metal-oxide semiconductor (CMOS), charge coupled device (CCD), and the like can be used. The main CPU 251 controls an imaging element controller 201, thereby controlling driving of the imaging element 202.

The charge accumulation time (exposure time) of each pixel is determined by an electronic shutter driving signal supplied from the imaging element controller 201. The main CPU 251 issues an instruction of the charge accumulation time to the imaging element controller 201.

In a case where the imaging apparatus 100 is set in the imaging mode, an output of the image signal is started in order to display a live view image on the monitor 213. The output of the image signal for the live view image is temporarily stopped in a case where an instruction for the actual imaging is issued, and the output is restarted in a case where the actual imaging ends.

The image signal, which is output from the imaging element 202, is an analog signal, and the analog image signal is fetched by an analog signal processing section 203. The analog signal processing section 203 is configured to include a correlated double sampling circuit (CDS) and an automatic gain control circuit (AGC). The CDS removes noise included in the image signal, and the AGC amplifies a noise-removed image signal with a predetermined gain. The analog image signal subjected to the desired signal processing in the analog signal processing section 203 is fetched into the A/D converter 204 (A/D: analog to digital).

The A/D converter 204 converts the fetched analog image signal into a digital image signal having a gradation width of a predetermined bit. This image signal is so-called RAW data, and has gradation values indicating densities of red (R), green (G), and blue (B) for each pixel. In a case where the imaging element 202 is a MOS type imaging element (MOS: Metal-Oxide Semiconductor), the A/D converter 204 is built into the imaging element 202 in many cases, and the above correlated double sampling is not necessary.

The image input controller 205 has a built-in line buffer, and accumulates image signals per one frame which is output from the A/D converter 204. The image signals per one frame accumulated in the image input controller 205 are stored in the SDRAM 232.

The image signals per one frame stored in the SDRAM 232 are fetched into the digital signal processing section 206 in a dot sequential order (pixel order). The digital signal processing section 206 performs signal processing on the image signals of the respective colors of R, G, and B fetched in the dot sequential order, thereby generating an image signal (Y/C signal) consisting of a luminance signal Y and color difference signals Cr and Cb.

As a method of controlling the first focus lens group FL1 and the second focus lens group FL2, a phase difference method can be used. In a case of performing the AF processing (AF: Automatic Focus) of the phase difference method, the first focus lens group FL1 and the second focus lens group FL2 in the interchangeable lens 300 are controlled such that an amount of defocus obtained from the phase difference data calculated using the pixels having a plurality of phase differences in the focus area in the image data is 0. In a case of using the phase difference method, an imaging element for phase difference AF may be provided separately, and the AF processing may be performed using the phase difference detected by the imaging element for phase difference AF. The focus control using a so-called contrast AF method will be described later.

The AE/AWB detection section 229 (AE: Automatic Exposure and AWB: Automatic White Balance) fetches the R, G, and B image signals stored in the SDRAM 232, integrates the G signals of the entire screen, integrates the G signals of the central portion and the peripheral portion of the screen weighted differently, and outputs the integrated value, which is necessary for the AE control, to the main CPU 251. The main CPU 251 calculates a luminance value from the integrated value and calculates an exposure value from the luminance value. In addition, the aperture value and the shutter speed are determined from the exposure value in accordance with the program diagram.

Further, the AE/AWB detection section 229 divides one screen into a plurality of areas (for example, 16×16) as physical quantities necessary for the AWB control, thereby calculating an average integrated value for each of the colors of the image signals of R, G, and B. The main CPU 251 calculates the ratios of R/G and B/G for each divided area from the integrated value of R, the integrated value of B, and the integrated value of G which have been obtained, and determines the type of the light source on the basis of distribution in the color space of R/G and B/G of calculated values of the R/G and BIG. Then, according to the white balance adjustment value suitable for the determined light source type, for example, the value of each ratio is approximately 1 (that is, the integration ratio of RGB in one screen is R:G:B=1:1:1). The gain value (white balance correction value) for the R, G, and B signals of the white balance adjustment circuit is determined. The AE/AWB detection section 229 performs white balance adjustment by applying a digital gain corresponding to the type of the light source to the image signal of one frame stored in the SDRAM 232, performs gamma (gradation characteristic) processing and sharpness processing, and generates R, G, and B signals.

The compression/decompression processing section 208 performs compression processing on the image data generated by the digital signal processing section 206 in accordance with a command from the main CPU 251, and generates compressed image data. In addition, decompression processing is performed on the compressed image data so as to generate uncompressed image data.

In accordance with the command from the main CPU 251, the media controller 234 records the image data, which is obtained through imaging, in the memory card 236 and reads the recorded image from the memory card 236. The display controller 210 controls display on the monitor 213 and the liquid crystal panel 248 in accordance with the command from the main CPU 251. The finder controller 238 drives the finder variable power lens 244 so as to insert and remove the finder variable power lens 244 into and from the optical axis thereof. The liquid crystal shutter controller 239 controls a light blocking state and a non-blocking state of the liquid crystal shutter 243.

The camera body 200 and the interchangeable lens 300 perform communication through the mount 256 of the camera body 200, the mount communication section 250, the mount 346 of the interchangeable lens 300, the mount communication section 350 (the target position acquisition section, the transmitter), and terminals 257 and 347 provided on the mount 256 and the mount 346. With such a configuration, various commands such as a lens movement command and a stop change command and responses thereof, various control statuses, lens information transmission commands and lens information corresponding thereto are transmitted and received.

<Characteristics of Focus Lens Group>

In the first embodiment, the driving resolution of the first focus lens group FL1 is set to 1.0 μm/LSB (LSB: Least Significant Bit), and the bit length of the command for designating the target position is set to 16 bits. In this case, the number of stopable positions is 65536, and the stroke (movable distance) is −32.768 mm to +32.767 mm. On the other hand, the driving resolution of the second focus lens group FL2 is 0.5 μm/LSB (the second focus lens group FL2 has a higher resolution) and is set separately of the resolution of the first focus lens group FL1. In this case, the number of stopable positions of the second focus lens group FL2 is 131072, and the stroke is −32.768 mm to +32.767 mm which is the same as that of the first focus lens group FL1. The first focus lens group FL1 and the second focus lens group FL2 may be composed of one or more optional number of lenses.

Figure 4:
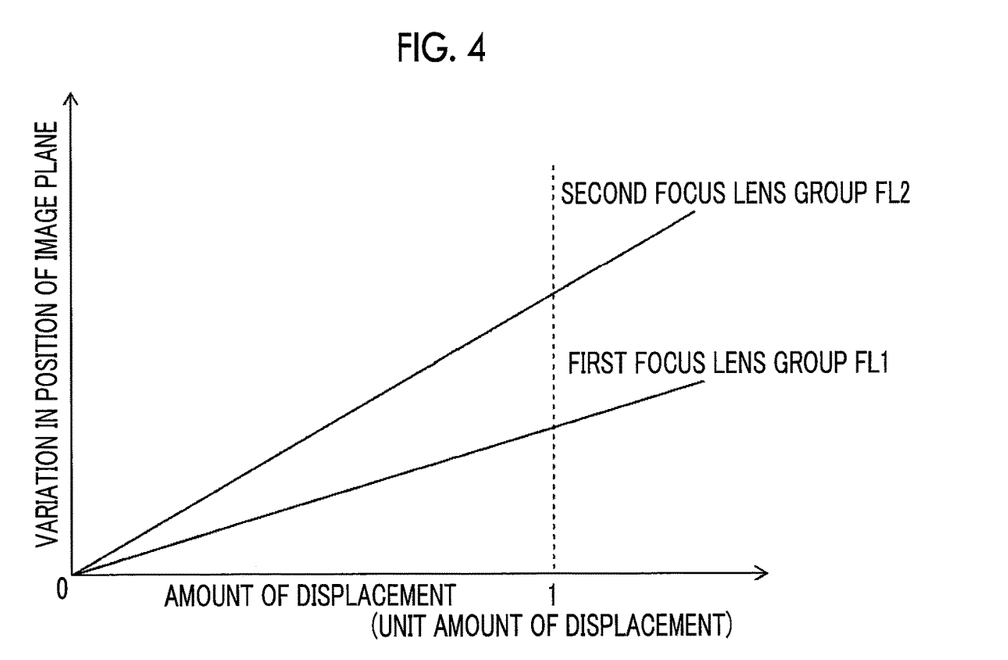
FIG. 4 is a conceptual diagram illustrating a relationship between amounts of displacement of the first focus lens group and the second focus lens group and a variation in position of an image plane.

FIG. 4 is a conceptual diagram illustrating the variation in position of the image plane (an example of a predetermined variation in lens characteristic) in a case where the same amount of displacement (unit amount of displacement) is separately applied to each of the first focus lens group FL1 and the second focus lens group FL2. In the first embodiment, as shown in FIG. 4, the variation in position of the image plane at the unit amount of displacement (amount of displacement "1") of the first focus lens group FL1 is lower than that of the second focus lens group FL2.

<Method of Driving Focus Lens>

Figure 5:
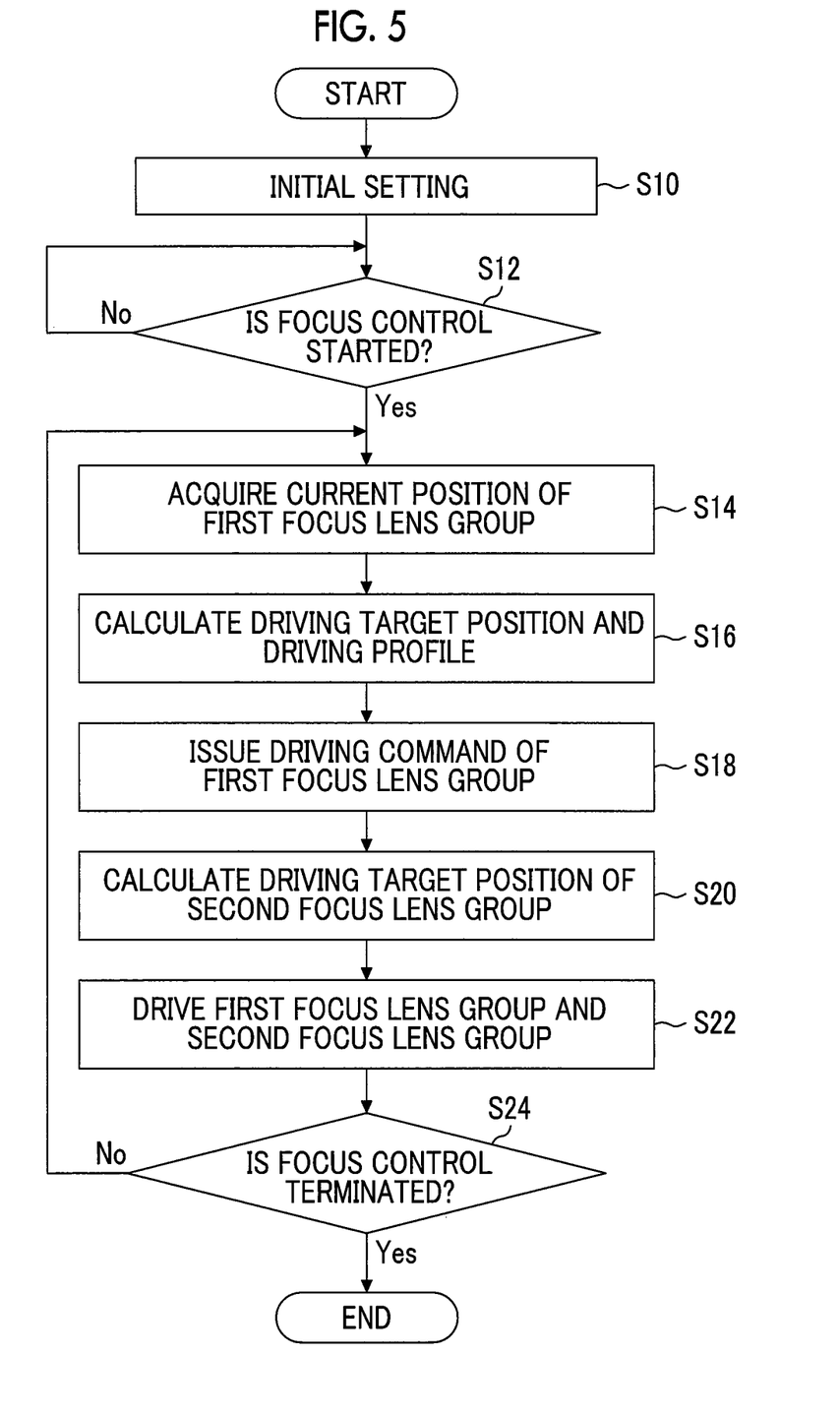
FIG. 5 is a flowchart illustrating processing of focus control.

Next, a focus lens driving method (lens driving method) in the imaging apparatus 100 having the above-mentioned configuration will be described. FIG. 5 is a flowchart illustrating a method of driving the focus lens in the first embodiment.

In a case where the imaging apparatus 100 is activated by turning on a power button or the like which is not shown in the drawing, initial setting is performed (step S10). In step S10, a request for acquiring the driving characteristic of the first focus lens group FL1 is transmitted from the camera body 200 to the interchangeable lens 300, in response to this request, the driving characteristic of the first focus lens group FL1 is transmitted from the interchangeable lens 300 to the camera body 200 (information transmission step), and the first focus lens group FL1 and the second focus lens group FL2 are driven to the initial position (home position). The driving characteristic of the first focus lens group FL1 transmitted to the camera body 200 includes, for example, a lens position where the object at infinity is in focus, a lens position where the close-range object is in focus, focal depth information, and a driving speed to the in-focus position.

It should be noted that in the information transmission step of step S10, only the information of the first focus lens group FL1 is transmitted to the camera body 200. Therefore, the camera body 200 generates a driving command in a state where it is assumed that only the first focus lens group FL1 is present without recognition of the presence and the driving characteristic of the second focus lens group FL2. The second focus lens group FL2 is driven by the amount of driving obtained by the calculation in the interchangeable lens 300 (refer to step S20 and step S22).

In a case where the initial setting of step S10 is completed, the processing proceeds to step S12, and the camera body 200 (main CPU 251) determines whether or not to start the focus control. The focus control may be started automatically after the initial setting is completed or may be started in response to a user operation such as setting of the live view mode. In a case where the determination is affirmative (Yes in step S12), the processing proceeds to step S14.

Figure 6:
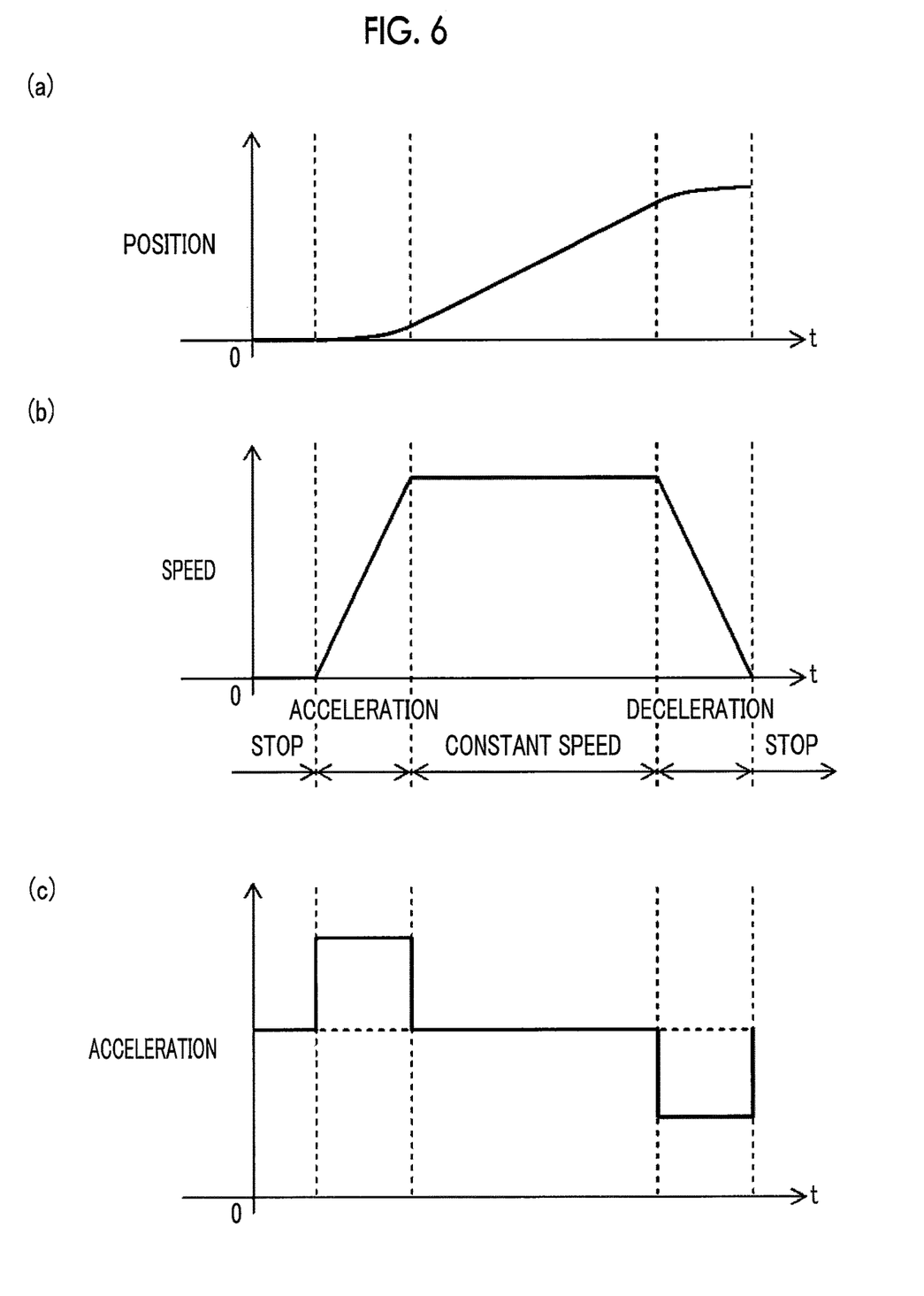
FIG. 6 is a conceptual diagram illustrating a driving profile of the first focus lens group.

In step S14, the camera body 200 requests the current position of the first focus lens group FL1 with respect to the interchangeable lens 300. In response to this request, the current position of the first focus lens group FL1 is transmitted from the interchangeable lens 300 to the camera body 200 (information transmission step). Subsequently, in step S16, the camera body 200 calculates the driving target position (first target position) and the driving profile of the first focus lens group FL1 through the above-mentioned phase difference AF processing. The driving target position is represented by a command having a 16 bit length, and the driving profile is represented by, for example, a profile of position, speed, and acceleration (refer to portions (a), (b), and (c) of FIG. 6).

In step S18, the camera body 200 transmits a driving command including the driving target position and the driving speed profile of the first focus lens group FL1 calculated in step S16 to the interchangeable lens 300, and the interchangeable lens 300 receives a driving command from the camera body 200 (target position acquisition step).

Figure 7:
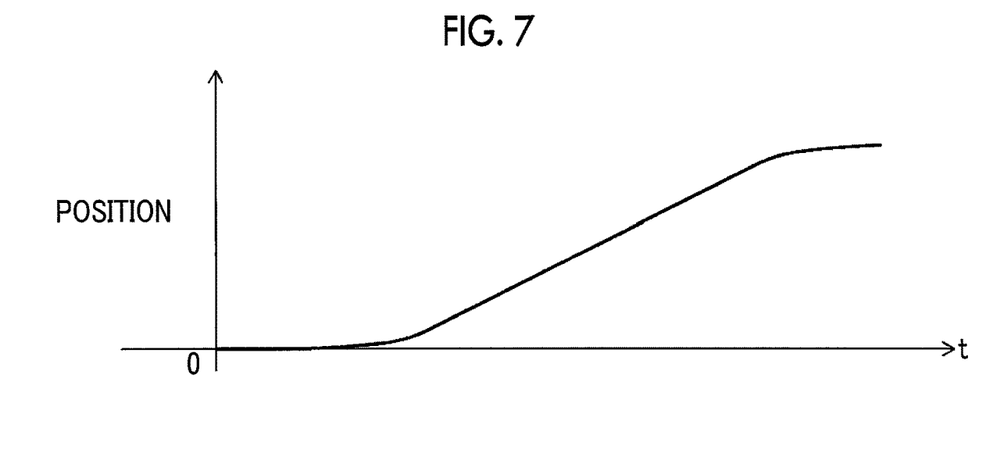
FIG. 7 is a conceptual diagram illustrating a driving profile of the second focus lens group.

In step S20, the lens CPU 340 calculates the target position of the second focus lens group FL2 (target position calculation step). Specifically, according to the amount of driving of the first focus lens group FL1 received in step S18, referring to a relationship (refer to FIG. 3) between the amount of driving of the first focus lens group FL1 and the amount of driving of the second focus lens group FL2 stored in advance in the ROM 344, the amount of driving of the second focus lens group FL2 is calculated. The target position (the second target position) of the second focus lens group FL2 can be calculated from the amount of driving and the current position of the second focus lens group FL2. FIG. 7 shows an example of the driving profile of the second focus lens group FL2 calculated in accordance with the driving profile of the first focus lens group FL1. In driving the second focus lens group FL2, acceleration and deceleration are controlled similarly to the first focus lens group FL1. The relationship shown in FIG. 3 has a different relationship depending on the lens characteristics, such as a linear function and a quadratic function having first order coefficients and intercepts. Such relationships may be stored in the form of a function, or may be stored in a table format and interpolated as necessary.

In step S22, the first focus lens group controller 320 and the second focus lens group controller 322 separately drive the first focus lens group FL1 and the second focus lens group FL2 to their respective target positions (lens driving step).

In step S24, the camera body 200 determines whether or not to end the focus control. In a case where the result is YES, the focus control is terminated, and in a case where the result is NO, the processing returns to step S14 and continues the control. The start and end of the focus control may be performed on the basis of the operation of the release button 211. For example, the focus control can be started by shifting to the live view image display mode, and the focus control can be terminated by the S1 operation of the release button 211 (operation of pushing the release button 211 halfway so as to lock the AE condition and the AF condition). After the S1 operation, an S2 operation (an operation of pushing the release button 211 to the bottom so as to acquire an image under a condition locked by the S1 operation) is performed, an image (still image) is acquired, and the acquired image is displayed on the monitor 213. In this case, the focus control can be resumed in a case where the image display is ended and the live view image display mode is restored. In a case of capturing a moving image, the above-mentioned focus control is performed while a moving image is being acquired.

Effect of First Embodiment

As described above, in the first embodiment, since the driving resolution is low, the number of stopable positions is less than that of the second focus lens group FL2. Further, the first focus lens group FL1 is driven on the basis of the communication command from the camera body 200. The first focus lens group FL1 has a variation in position of the image plane greater than that of the second focus lens group FL2 in a case where the amounts of displacement (unit amount of displacement) which are the same are separately given to the lens groups. On the other hand, since the driving resolution is high, the number of stopable positions is larger than the first focus lens group FL1. Further, the second focus lens group FL2 is driven by calculating the amount of driving through calculation in the interchangeable lens 300. The second focus lens group FL2 has a variation in position of the image plane greater than that of the first focus lens group FL1 in a case where the amounts of displacement (unit amount of displacement) which are the same are separately given to the lens groups. Therefore, it is possible to drive the second focus lens group FL2 by a necessary amount without deteriorating the driving resolution due to the restriction of the bit length of the communication command.

In a case where the second focus lens group FL2 is driven by the command (bit length: 16 bits) from the camera body 200 as in the conventional technique in the interchangeable lens 300, the number of stopable positions is 65536 which is the same as that of the first focus lens group FL1. Thus, in a case where the driving resolution is 0.5 µm/LSB, the stroke is −16.384 mm to +16.3835 mm. Therefore, for example, in a case where the amount of movement for focusing on the object is −32.768 mm, it is inevitable that the driving resolution is reduced to 1.0 µm/LSB or less. As a result, it is difficult to achieve both the driving range and the resolution of the focus lens.

As described above, by using the imaging apparatus 100, the camera body 200, and the interchangeable lens 300 according to the first embodiment, it is possible to achieve both the driving range and the resolution of the focus lens. In addition, since it is only necessary to apparently control one lens (the first focus lens group FL1) from the camera body 200, the system can be simplified.

The plurality of focus lens groups included in the interchangeable lens 300 may include an aberration correction lens group for correcting optical aberrations of the interchangeable lens 300 caused by displacement (driving) of the first focus lens group FL1 and/or the second focus lens group FL2. Further, such an aberration correction lens group may correspond to the first focus lens group FL1 or the second focus lens group FL2.

Further, in the first embodiment, the number of focus lens groups is not limited to 2, and may be equal to or greater than 3. In a case where the number of focus lens groups is equal to or greater than 3, a lens group, of which the variation in position of the image plane at the unit amount of displacement is smallest, may be set as the first focus lens group FL1, and the second, third, or following lens group may be set as the first focus lens group FL1. In a case where the lens group having a variation in position of the image plane at the unit amount of displacement larger than that of the first focus lens group FL1 is driven as the second focus lens group FL2 on the basis of the calculation on the lens side, it is possible to obtain the same effect as in the above-mentioned aspect.

<Focus Lens Control by Contrast AF Method>

In the description of the above-mentioned example, the phase difference AF method is used as the method of controlling the first focus lens group FL1 and the second focus lens group FL2, but the focus lens group may be controlled by a so-called contrast AF method. In the case of using the contrast AF method, the AF detection section 227 fetches the image signals of red (R), green (G), and blue (B) stored in the SDRAM 232 in accordance with the command of the main CPU 251 and calculates a focus evaluation value necessary for automatic focus (AF) control. The AF detection section 227 includes a high-pass filter that passes only the high-frequency component of the G signal, an absolute value processing section, an AF area extraction section that cuts out a signal in a focus area (hereinafter referred to as an AF area) which is set on the screen, and an integration section that integrates absolute value data in the AF area, and outputs absolute value data in the AF area integrated by the integration section to the main CPU 251 as a focus evaluation value.

As a method of controlling the first focus lens group FL1 and the second focus lens group FL2 on the basis of such a focus evaluation value, the following methods can be used: a method of searching for a position where the focus evaluation value is maximum and moving the focus lens to that position; and a hill climbing method of setting the first focus lens group FL1 and/or the second focus lens group FL2 in a case where the first focus lens group FL1 and/or the second focus lens group FL2 is moved in a direction to increase the focus evaluation value and it is detected the focus evaluation value begins to decrease. Regarding the AF search (driving for detecting the above-mentioned position where the focus evaluation value becomes maximum or begins to decrease) using these methods, the speed is controlled by determining the search speed (the driving speed of the first focus lens group FL1) on the basis of focal depth information on the focus lens side, the in-focus position is confirmed, and thereafter the camera body 200 notifies the interchangeable lens 300 of the speed profile for moving to the in-focus position.

In a case where the contrast AF method is used, the first focus lens group FL1 is driven not only for the driving control of driving to the in-focus position but also for the AF search in the same way as described above, on the basis of the target drive position received from the camera body 200, and the second focus lens group FL2 is driven on the basis of the amount of driving calculated on the lens side.

Second Embodiment

Figure 8:
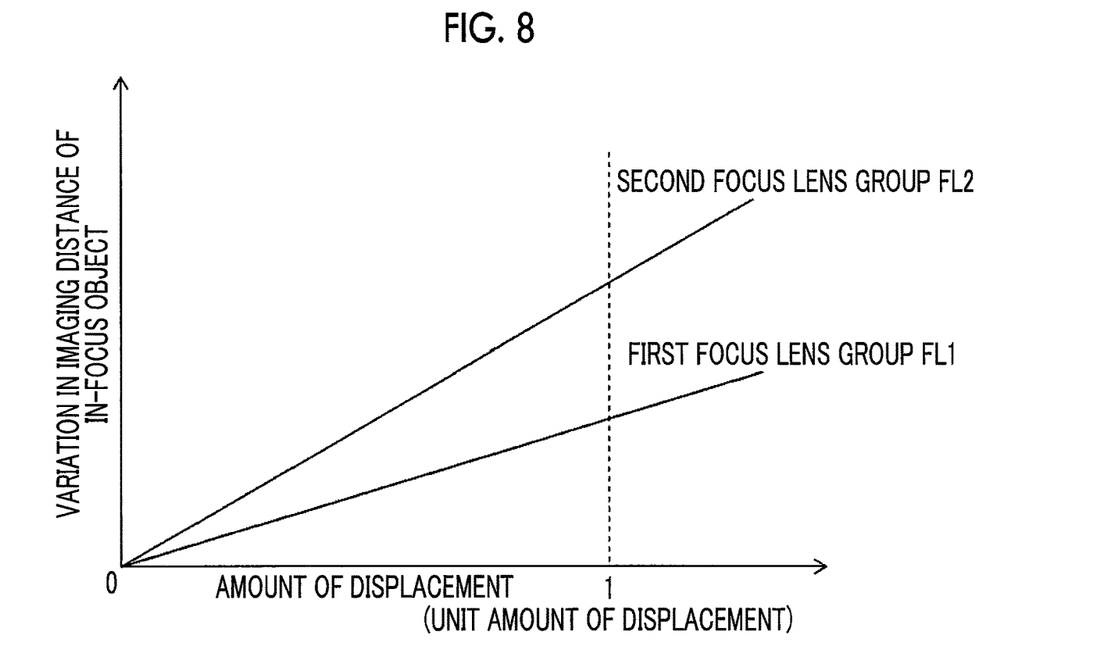
FIG. 8 is a conceptual diagram illustrating a relationship between amounts of displacement of the first focus lens group and the second focus lens group and an imaging distance of an in-focus object.

In the above-mentioned first embodiment, the focus lens group, of which the variation in position of the image plane is larger than that of the second focus lens group FL2 in a case where the same amounts of displacement (unit amount of displacement) are separately given to the lens groups, is set as the first focus lens group FL1 and is driven on the basis of the communication command from the camera body 200. However, the first focus lens group in the present invention is not limited to such a lens group. As the first focus lens group FL1, the following focus lens group may be used: a focus lens group of which a desired amount of displacement from a state in which the object at the infinite imaging distance is in focus to a state in which the object at the shortest imaging distance is in focus is less than that of the second focus lens group, that is, a focus lens group of which a variation (an example of the predetermined variation in lens characteristic) in imaging distance of the in-focus object is less than that of the second focus lens group FL2 in a case where the same amounts of displacement (unit amount of displacement) are separately given to the lens groups (refer to FIG. 8). In the second embodiment, the driving resolutions and the numbers of stopable positions of the first focus lens group FL1 and the second focus lens group FL2 can be set as the same values as in the first embodiment.

By using such a lens group as the first focus lens group FL1, it is possible to accurately control the second focus lens group FL2, of which a desired amount of displacement (stroke) from the state in which the object at the infinite imaging distance is in focus to the state in which the object at the short imaging distance is in focus is large, on the interchangeable lens 300 side. Thereby, also in the second embodiment, as in the first embodiment, it is possible to achieve both the driving range and the resolution of the focus lens without the restriction of the communication command. In addition, since it is only necessary to apparently control one lens (the first focus lens group FL1) from the camera body 200, the system can be simplified.

In the second embodiment, the configurations of the imaging apparatus, the camera body, and the interchangeable lens, and the lens driving method can be the same as that in the above-mentioned first embodiment. Therefore, a detailed description thereof will be omitted (refer to FIGS. 1 to 7 and corresponding description).

Third Embodiment

Figure 9:
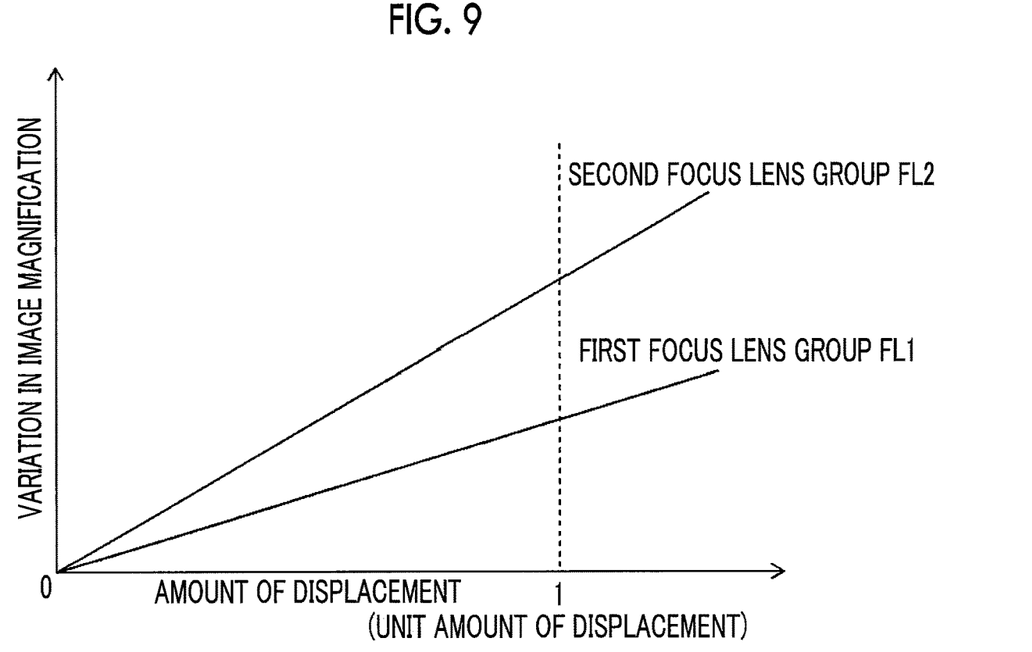
FIG. 9 is a conceptual diagram illustrating a relationship between amounts of displacement of the first focus lens group and the second focus lens group and a variation in image magnification.

In addition to the above-mentioned first and second embodiments, a lens group, of which a variation in image magnification (refer to FIG. 9) at the unit amount of displacement is less than that of the second focus lens group FL2, may be set as the first focus lens group FL1. In the third embodiment, the driving resolutions and the numbers of stopable positions of the first focus lens group FL1 and the second focus lens group FL2 can be set as the same values as in the first and second embodiments.

By using such a lens as the first focus lens group FL1, it is possible to accurately control the second focus lens group FL2, of which a variation in image magnification (an example of the predetermined variation in lens characteristic) at the unit amount of displacement is large, on the interchangeable lens 300 side. Thus, also in the third embodiment, as in the first and second embodiments, it is possible to achieve both the driving range and the resolution of the focus lens without the restriction of the communication command, and it is possible to reduce the effect of breathing (variation in the angle of view caused by the focus control). Furthermore, since it is only necessary to apparently control one lens (the first focus lens group FL1) from the camera body 200, the system can be simplified.

In the third embodiment, the configurations of the imaging apparatus, the camera body, and the interchangeable lens, and the lens driving method can be implemented in the same manner as in the above-mentioned first and second embodiments. Therefore, a detailed description thereof will be omitted (refer to FIGS. 1 to 8 and corresponding description).

Fourth Embodiment

The above-mentioned first to third embodiments describes the case of using, as the first focus lens group FL1, "the focus lens group of which any one of the variation in position of the image plane, the variation in imaging distance of the in-focus object, or the variation in image magnification is less than that of the second focus lens group FL2 in the case where the same amounts of displacement (unit amount of displacement) are separately given to the lens groups". However, the first focus lens group FL1 may be "a focus lens group of which two or more of the variation in position of the image plane, the variation in imaging distance of the in-focus object, and the variation in image magnification are less than those of the second focus lens group FL2". Further, for example, the first focus lens group FL1 may be "the focus lens group of which the variation in position of the image plane, the variation in imaging distance of the in-focus object, and the variation in image magnification are all less than those of the second focus lens group FL2". Even in such a case, the configuration of the imaging apparatus, the camera body, the interchangeable lens, and the lens driving method can be implemented in the same manner as in the first to third embodiments described above. Thereby, it is possible to achieve both the driving range and the resolution of the focus lens, and it is possible to simplify the system.

<Others>

The present invention can be applied to not only the case of electronically performing the focus control as in the above-mentioned embodiment, but also a case of electronically performing the actual focus control started by a trigger which is a manual operation such as rotation of a focus ring. For example, in the case where the trigger for starting the focus control is the rotation of the focus ring by the user, the target driving position and the driving speed of the first focus lens group FL1 are calculated on the camera body 200 side in accordance with the speed and the amount of rotation of the focus ring.

Although the embodiments of the present invention have been described above, the present invention is not limited to the above-mentioned embodiments, and may be modified into various forms without departing from the scope of the present invention.

EXPLANATION OF REFERENCES

100: imaging apparatus
200: camera body
201: imaging element controller
202: imaging element
203: analog signal processing section
204: A/D converter
205: image input controller
206: digital signal processing section
208: compression/decompression processing section
210: display controller
211: release button
212: dial
213: monitor
214: finder selector lever
220: operation section
227: AF detection section
228: ROM
229: AE/AWB detection section
231: flash ROM
232: SDRAM
234: media controller
236: memory card
238: finder controller
239: liquid crystal shutter controller 241: finder window
243: liquid crystal shutter
244: finder variable power lens
248: liquid crystal panel
250: mount communication section
251: main CPU
252: battery
256: mount
257: terminal
300: interchangeable lens
310: zoom lens controller
320: first focus lens group controller
322: second focus lens group controller
330: stop controller
340: lens CPU
342: RAM
344: ROM
346: mount
347: terminal
350: mount communication section
Cb: color difference signal
Cr: color difference signal
FL1: first focus lens group
FL2: second focus lens group
I: stop
L1: optical axis
L2: optical axis
S10 to S24: steps of lens driving method
SW: arrow
Y: luminance signal
ZL: zoom lens

What is claimed is:

1. A lens apparatus to be mounted on a camera body, the lens apparatus comprising:
 a plurality of focus lens groups that includes a first focus lens group and a second focus lens group which are separately driven;
 a target position acquisition section that acquires a first target position, which is a driving target position of the first focus lens group, at a predetermined bit length through communication with the camera body;
 a calculation section that calculates a second target position, which is a driving target position of the second focus lens group, on the basis of the first target position; and
 a driving section that drives the first focus lens group in accordance with the first target position and drives the second focus lens group in accordance with the second target position,
 wherein the first focus lens group is a focus lens group in which the number of stoppable positions is less than that of the second focus lens group.

2. The lens apparatus according to claim 1, wherein the first focus lens group is a focus lens group of which a predetermined variation in lens characteristic of the lens apparatus is less than that of the second focus lens group in a case where a same amount of displacement is given to each focus lens groups.

3. The lens apparatus according to claim 2, wherein the predetermined variation in lens characteristic is a variation in position of an image plane at a unit amount of displacement.

4. The lens apparatus according to claim 2,
 wherein a driving resolution of the first focus lens group and a driving resolution of the second focus lens group are separately set, and
 wherein the driving resolution of the first focus lens group is lower than the driving resolution of the second focus lens group.

5. The lens apparatus according to claim 2, wherein the predetermined variation in lens characteristic is a variation in imaging distance of an in-focus object at a unit amount of displacement.

6. The lens apparatus according to claim 2, wherein the first focus lens group is a focus lens group of which a desired amount of displacement from a state in which the object at an infinite imaging distance is in focus to a state in which an object at a shortest imaging distance is in focus is less than that of the second focus lens group.

7. The lens apparatus according to claim 2, wherein the predetermined variation in lens characteristic is a variation in image magnification at a unit amount of displacement.

8. The lens apparatus according to claim 1, wherein the calculation section calculates the second target position by referring to a relationship between an amount of displacement of the first focus lens group and an amount of displacement of the second focus lens group stored in advance.

9. The lens apparatus according to claim 1, wherein the plurality of focus lens groups includes an aberration correction lens group for correcting optical aberration of the lens apparatus caused by displacement of the first focus lens group and/or the second focus lens group.

10. The lens apparatus according to claim 1, further comprising a transmitter that transmits information, which indicates a driving characteristic of the first focus lens group, to the camera body,
 wherein the target position acquisition section acquires a driving target position, which is generated by the camera body on the basis of the transmitted information, as the first target position.

11. A camera system comprising:
 the lens apparatus according to claim 1; and
 the camera body on which the lens apparatus is mounted.

12. A lens driving method for a lens apparatus that is to be mounted on a camera body and includes a plurality of focus lens groups including a first focus lens group and a second focus lens group which are separately driven and a driving section driving the first focus lens group and the second focus lens group, the lens driving method comprising:
 a target position acquisition step of acquiring a first target position, which is a driving target position of the first focus lens group, at a predetermined bit length through communication with the camera body;
 a target position calculation step of calculating a second target position, which is a driving target position of the second focus lens group, on the basis of the first target position; and
 a lens driving step of driving the first focus lens group in accordance with the first target position and driving the second focus lens group in accordance with the second target position,
 wherein the first focus lens group is a focus lens group in which the number of stoppable positions is less than that of the second focus lens group,
 wherein in the target position acquisition step, a focus lens group, of which a predetermined variation in lens characteristic of the lens apparatus is less than that of the second focus lens group in a case where a same amount of displacement is given to each focus lens groups, is set as the first focus lens group, and the first target position is received.

13. The lens driving method according to claim 12, further comprising an information transmission step of transmitting information, which indicates a driving characteristic of the first focus lens group, to the camera body,
 wherein in the target position acquisition step, a driving target position, which is generated by the camera body on the basis of the transmitted information, is acquired as the first target position.

* * * * *